G. UPHAM.
Fowl Roost and Bee Hive.
No. 4,018.
Patented May 1, 1845.
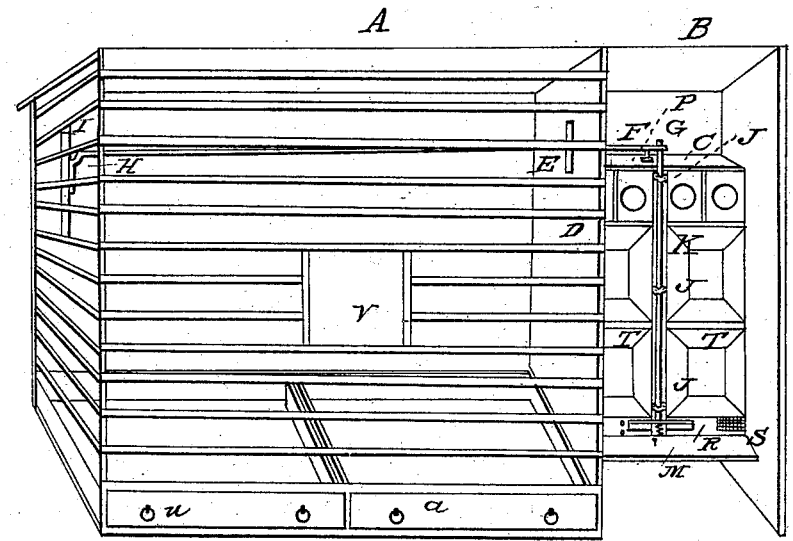
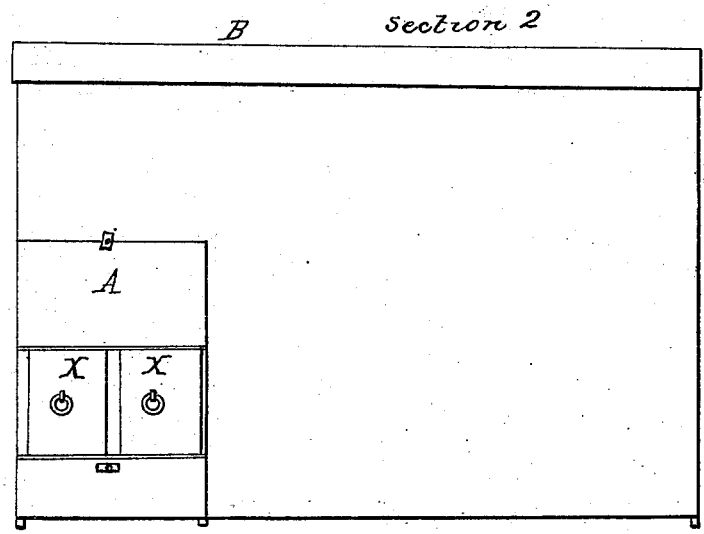
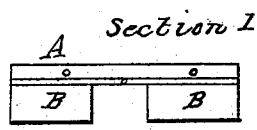

UNITED STATES PATENT OFFICE.

GEORGE UPHAM, OF HEBRON, OHIO.

CLOSING AND OPENING THE ENTRANCES TO BEEHIVES.

Specification of Letters Patent No. 4,018, dated May 1, 1845.

*To all whom it may concern:*

Be it known that I, GEORGE UPHAM, of Hebron, in the county of Licking and State of Ohio, have invented a new and Improved Mode of Shutting Out Millers or Bee-Moths from Bee Hives or Palaces; and I do hereby declare that the following is a full and exact description.

The nature of my invention consists in providing means of shutting out from the hive or bee palace the miller or bee moth at night and of opening it in the morning (that the bees may resume their labor) by connecting with the bee hive or palace the roost of chickens or other fowls (or in other words the coop of chickens or other fowls) so as to convert the roost (whether it be a pole, a rope, or any other thing upon which fowls roost) into a lever or pulley—either by hanging it as described herein, or by placing it upon a fulcrum—or in any other manner by which it can be used as a lever or pulley, or be made the means of shutting and opening the bee hive or palace, without that close attention which would be required of individuals shutting and opening the same at a proper time.

To enable others to make and use my invention I will proceed to describe its construction and operation.

I construct my bee hives or bee palace in any of the known forms—and connect them with the roost for chickens or other fowls or with the coop for chickens or other fowls.

In the annexed drawing letter A, is the coop; letter B, the partition in which the bee hives or palace is placed.

The annexed drawing is upon a scale of half an inch to the foot, making the coop and partition for the hives or palace 12½ by 4 feet (the coop and partition for the hives may be varied or constructed in any other form). The bee hives or palace C, is placed in the back part of the partition designed for the same—so that they occupy about one half of the depth of the same. The partition D, between the coop and bee hives or palace is made tight, except a small opening E, through which the roost or lever F, passes. In this drawing one end of the roost F, I have represented as hung by a hinge H, to the end of the coop I, the other end passing through the small opening E, is connected to the upper end of the piston G, which works up and down perpendicularly through small apertures or guides J, J, J, which apertures or guides are fastened to the partition K, which partition separate the hives perpendicularly. This partition should be thick enough to allow the guides to be fastened on without interfering with the hives. The lower end of the piston is connected or fastened to a shutter L (see section 1, where the shutter which I have made in this drawing is more fully represented) or in any other manner by which the roost may be made to shut the same. The shutter L, is raised by any description of spring or springs whether a coiled wire, a common steel spring or springs of any other description fastened to the projection M, or otherwise at one end, and under the shutter in the center (or at either or both ends of the same). When the fowls leave the roost the spring or springs by its or their elasticity raise the shutter L, together with the piston and roost, and open the passage of the bee o, o.

P, is a small box to contain weights by which to regulate the spring Q.

Letter R is a projection of something like an inch against which the shutter L works—and through the lower part of which the passage of the bee O, O, is made S S. ventilators or small apertures made through the facing and hives and covered with woven wire. In the annexed drawing the lower hives draw out from the back side of the apartment B. See drawing, section 2.

Letter A is a door which opens up sufficiently large to take out the hives X, X.

The hives which are put in at back side fit up to the facing T, T, the passage of the bee being made in the hives X X and also the ventilators to fit and correspond with those in the facings T, T.

U, U, are drawers to receive the manure of fowls; V, the entrance to the coop. The coop is not designed to be shut up.

Section 1 is the shutter; letter A, a bar of some kind of metal to which the plates (of brass or any other material) B, B, are fastened.

I will describe its operation. By connecting the chicken coop or coop for fowls with the bee hive or palace I make use of the roost as a lever or pulley or use it in any manner by which it can be made to shut and open the passage or passages of the bee and shut out at night from the bee hive or palace the bee moth or miller and open the passage of the bees in the morning that they may resume their labors. When the roost F is hung as in the annexed drawing the roost F is the lever; the chickens or fowls which roost at night upon the roost F is the power to shut the passage of the bee and thereby shut out the bee moth or miller at a proper time, by overcoming the resistance of the coil wire or spring Q by their weight. In the morning when the chickens leave the roost the coiled wire or spring resists the appendages, as the piston, the roost, &c., and thus opens the passage or passages of the bee to resume their labor.

I have contemplated placing one two or more roosts in the same coop and of using them as a lever pulley, &c., when more hives are wanted to be closed up the partition for bee hives can be enlarged and more hives set in by those already described and the same entrance used by making a passage from the present bee entrance o. Between the facing T, and the lower hive which shoves in from behind—dividing and separating the additional hives as by the partition K, continuing the passage for the bee through said additional partition and through into the additional lower hive, and from thence through openings into hives above.

The passage for the bee can be opened and shut by various devices always using the roost of fowls as the means the fowls themselves the agent by which the lever or pulley &c., is operated.

What I claim as my invention and desire to secure by Letters Patent is—

The connection of the roost—whether of chickens or other fowls with the bee hive or palace, the use of the roost as a lever or instrument by which the passage or passages of the bees (into and out of their hives) are shut at night and opened in the morning—or any other manner of using the roost of fowls whether the roost is a pole a rope or any other thing.

GEORGE UPHAM.

Witnesses:
 THOS. G. BLACK,
 JACOB JOHNSON.